UNITED STATES PATENT OFFICE.

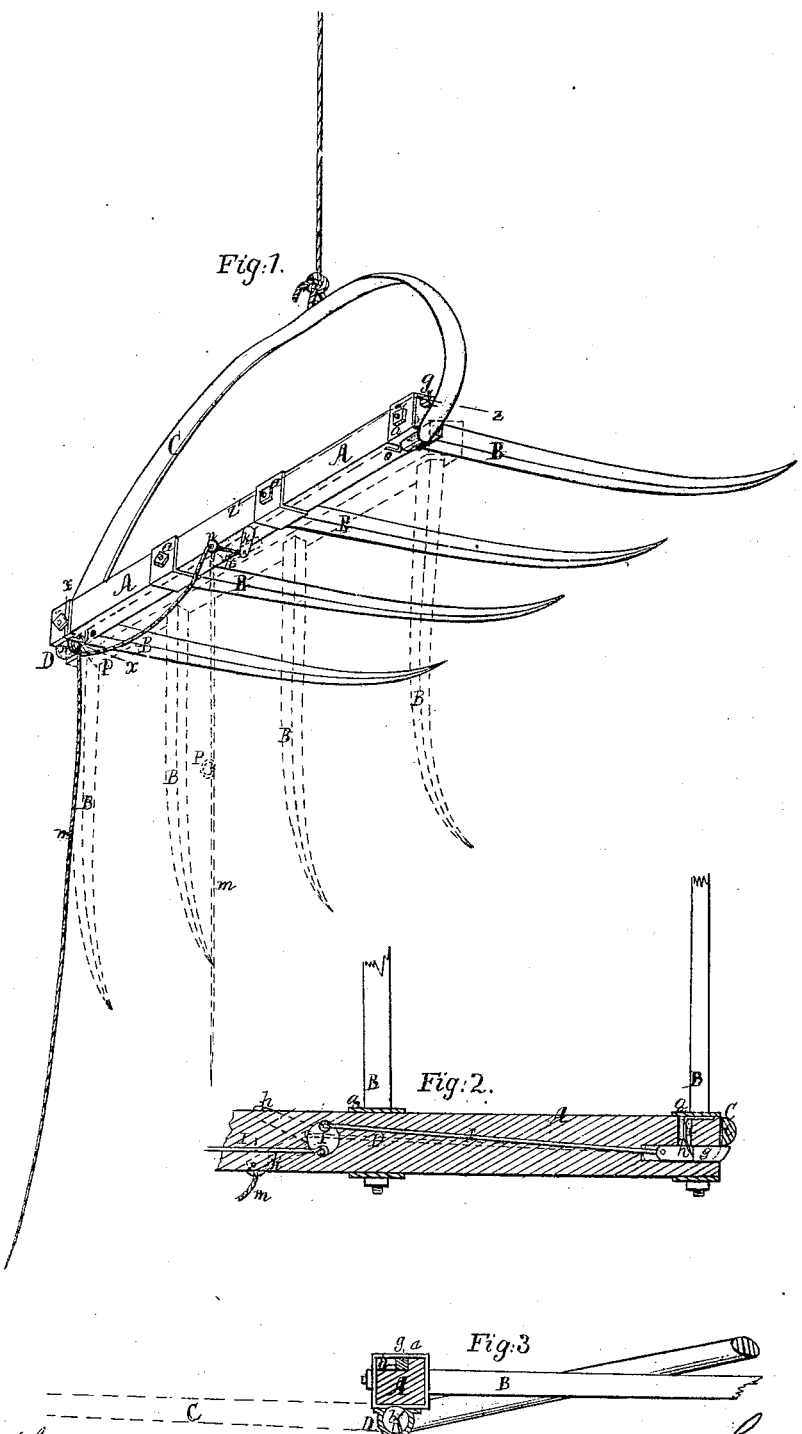

GROVE F. STRONG, OF ONONDAGA, NEW YORK.

IMPROVEMENT IN HORSE HAY-FORKS.

Specification forming part of Letters Patent No. 51,490, dated December 12, 1865.

*To all whom it may concern:*

Be it known that I, GROVE F. STRONG, of Onondaga, in the county of Onondaga and State of New York, have invented a new and useful Improvement in Horse Hay-Forks; and I do hereby declare the following to be a full, clear, and exact description of the same, reference being had to the accompanying drawings, in which—

Figure 1 is a perspective view of my fork as it appears when in use. Fig. 2 is a horizontal section of the fork-head on the line z z of Fig. 1. Fig. 3 is a vertical cross-section on the line x x of Fig. 1.

The nature of my invention consists in a novel and simple means of hanging the said fork, and also in a novel and simple mode of tripping, so that the whole implement is very simple in construction, inexpensive to manufacture, and efficacious in use.

That others may understand the construction and use of my invention, I will more particularly describe it.

A is a bar of wood forming the fork-head. It is of proper length and size to possess the requisite strength. The teeth B B B B are set in this head in any suitable manner, though the method preferred by me is shown in the drawings. At the ends of the rake-head A are suitable lugs or ears, to form bearings for the ends of the bail or handle C. The hoisting-rope is attached to the bail C at its center, as shown at c. The latch which maintains the teeth B in a horizontal position while the fork is being hoisted is situated at the end of the head A. The fork may be tripped by a cord, as is usual.

These are the general features of my invention. The particular construction which I prefer may be described as follows:

The teeth B are forged with a shoulder and tang at the base of each and a nut at the end of the tang. I place the bands a a around the fork-head for the purpose of imparting additional strength. The tangs of the teeth pass through these bands, so that the shoulders are in contact with one side and the nuts in contact with the other, so that the head A cannot be split by the tooth, nor can the latter get loose. Upon the under side of each end band I place the boxes D D, and into these boxes I fit the ends of the bail C, so that when the fork is suspended the teeth of the fork may be made to stand out horizontally, or they may hang vertically, as shown by red lines in Fig. 1; or the bail may be thrown forward, so as to rest upon the teeth, for convenience of transportation, as shown in Fig. 3. From this it will appear that it is necessary to permit the bail to turn upon its journals through about one-half of a circle. It would be objectionable to allow it any greater freedom, and I therefore cut away a small portion of the end of each journal, so as to form a shoulder, as at b, Fig. 3. When the bail is thrown forward as far as it can go it rests upon the upper sides of the teeth B, and when it is thrown backward far enough to be in line with said teeth the shoulder b comes in contact with the stop-pin d, and is not permitted to go any farther.

When the fork is being elevated with its load it is, of course, necessary that the teeth B should be maintained in a horizontal position, and when it has reached the place where the load is to be deposited that the teeth should then be permitted to fall, so as to release the load. To accomplish this I place latch-bolts g in the ends of the fork-head, as shown in Figs. 1, 2, and 3. These latches are so placed and formed that when the teeth hang vertically, as shown by red lines in Fig. 1, the bail may be thrown forward and pass over the latches, because the bail then comes in contact with their inclined ends; but after passing in front of the latches it cannot return unless they be withdrawn by some power applied for that especial purpose, and when the bail is in contact with the front or stop sides of the latch-bolts it then stands inclined forward, as shown in Fig. 1, so that the center of the bail or point of suspension c is above the center of gravity of the fork and its load, and the proper position will always then be maintained.

The latches are withdrawn by means of a crank and cord when the load is to be dumped, and the springs h are placed behind them to return them outward again when the force which withdraws them is removed.

A little distance from the center (lengthwise) of the fork-head I place a bolt, i, vertically through the head. Upon the lower end of this bolt is the lever k, and upon the upper end is a cross-head, to which rods l are attached, communicating with the latch-bolts g. To the end of the lever k the tripping-cord m is secured;

and it is apparent from an inspection of Fig. 2 that if the lever $k$ be moved so as to turn the bolt $i$ upon its axis, the cross-head will also be moved and the rods 1 and latches $g$ be withdrawn. To secure the tripping-cord always in proper direction from its attachment to the lever $k$ it is passed through the loop $n$.

On the under side of the fork-head, as near to the ends as convenient, I place the hooks $o$ $o$, and to the tripping-cord $m$, at a point far enough from the loop $n$ to reach the hook $o$ and leave some slack between, I secure the ring $p$, and by means of the hook $o$ and this ring I convert the tripping-cord into a guide-rope, for by placing the ring on the hook $o$ before the fork is elevated the weight of the rope and any additional pressure to swing the fork one way or another is received upon the hook, and the lever $k$ is unaffected; but when the fork has reached its point of destination, and the load is to be dumped, the ring may be easily removed from the hook by a slight jerk of the cord $m$ in the proper direction, and it is then free to act upon the lever $k$ and the latches $g$.

From the foregoing description it will appear that my device is of the utmost simplicity, there being but two turning joints and two latches, of the simplest possible form, and operated in the most direct manner. These conditions enable me to produce my device at a low cost and with less inherent liability to derangement in the hands of the user.

The operation of my apparatus is so apparent from the description and drawings that but little need be said concerning it. The tines of the fork are thrust into the bundle of hay to be elevated and the bail thrust forward in front of the stop-latches. As it is being elevated the ring $p$ may be slipped onto the hook $o$, and the tripping-cord then becomes a guide-rope, by which the mass may be guided over the proper point of deposit, and then by a single slight jerk in the proper direction the ring is slipped from the hook, and the cord is free to act directly upon the lever $k$ and the latches. A quick jerk or pull upon the cord instantly withdraws the latches, and the tines of the fork fall down to a vertical position, depositing the load of hay upon the stack or mow without the assistance of any person except the one who attends to the tripping-cord.

Having described my invention, what I claim as new, and desire to secure by Letters Patent, is—

1. A horse hay-fork suspended by a simple bail without braces held in working position by latches at the ends of the fork-head, substantially as shown.

2. In combination with the bail or handle of a horse hay-fork, the latch-bolts $g$, constructed and operating substantially as shown.

3. In combination with the bail or handle of a horse hay-fork, the lever $k$, with the cross-head $i$ and connections 1, for the purpose of withdrawing the latches and liberating the fork.

4. In combination with a horse hay-fork, the hooks $o$ $o$ and ring $p$, for the purpose of enabling the tripping-cord to be used as a guide-rope, substantially as described.

GROVE F. STRONG.

Witnesses:
R. D. O. SMITH,
EDM. F. BROWN.